United States Patent [19]

Sampson

[11] Patent Number: 4,869,352
[45] Date of Patent: Sep. 26, 1989

[54] BRAKE SHOE GUIDE MEMBER AND BRAKE USING SAME

[75] Inventor: Ernest C. Sampson, Fulton, Mich.

[73] Assignee: Eaton Corporation, Cleveland, Ohio

[21] Appl. No.: 247,824

[22] Filed: Sep. 22, 1988

[51] Int. Cl.⁴ .................... F16D 51/22; F16D 69/04; A44B 21/00
[52] U.S. Cl. ...................... 188/340; 24/543; 188/250 F
[58] Field of Search ............ 188/340, 335, 78, 325, 188/250 F, 250 D, 250 E, 329, 330; 411/522, 523, 524, 174; 24/543, 563, 293

[56] References Cited

U.S. PATENT DOCUMENTS

| | | | |
|---|---|---|---|
| 797,214 | 8/1905 | O'Haire | 24/563 X |
| 1,619,579 | 3/1927 | Link | 188/250 F |
| 2,412,335 | 12/1946 | House | 188/340 X |
| 3,869,027 | 3/1975 | Chlebowski | 188/340 |
| 476,968 | 10/1984 | Urban et al. | 188/329 |

Primary Examiner—Robert J. Oberleitner
Attorney, Agent, or Firm—A. E. Chrow

[57] ABSTRACT

A brake shoe guide member (50) is provided that is adapted to be firmly secured to the brake spider (38) and which features a pair of spaced-apart guide surfaces (56, 56) on one side of the brake shoe web (16) and an opposed guide surface (58) on an opposite side of web (16) intermediate surfaces (56, 56) such that web (16) is held in substantial parallel alignment with spider (38) by guide surfaces (56, 56 and 58) as web (16) moves therebetween when the brake shoe moves between the retracted and expanded positions.

15 Claims, 2 Drawing Sheets

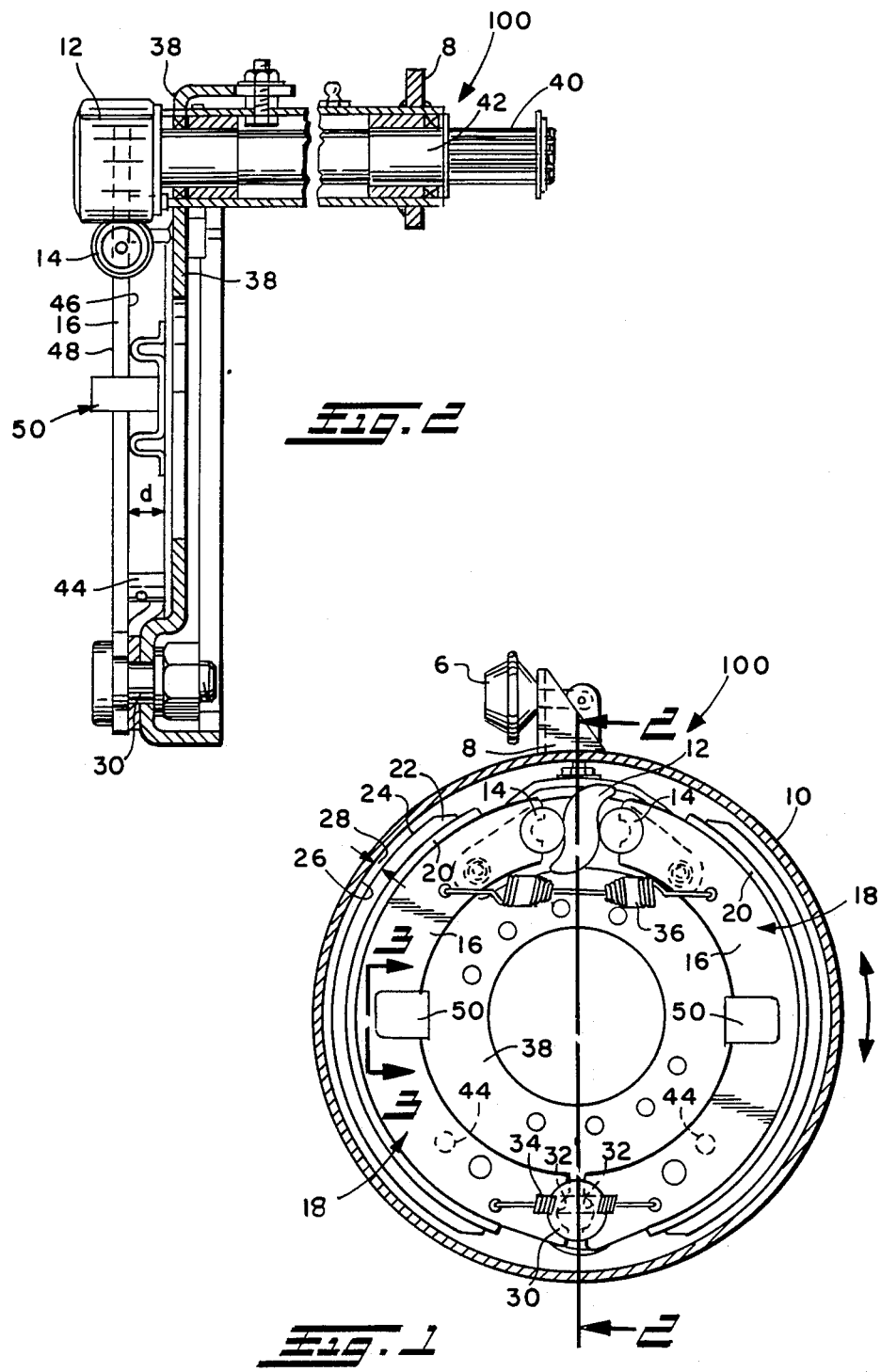

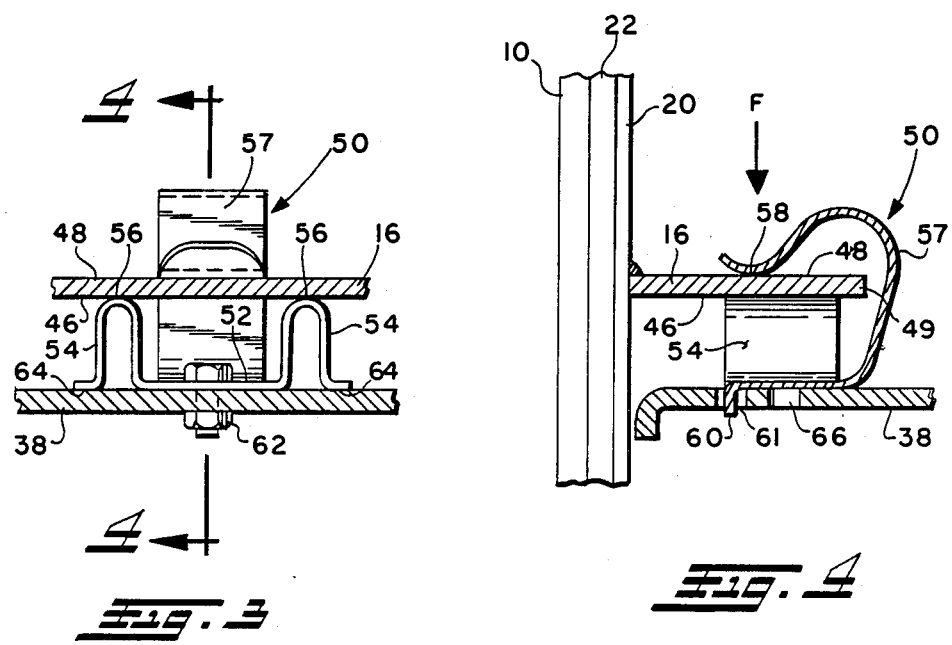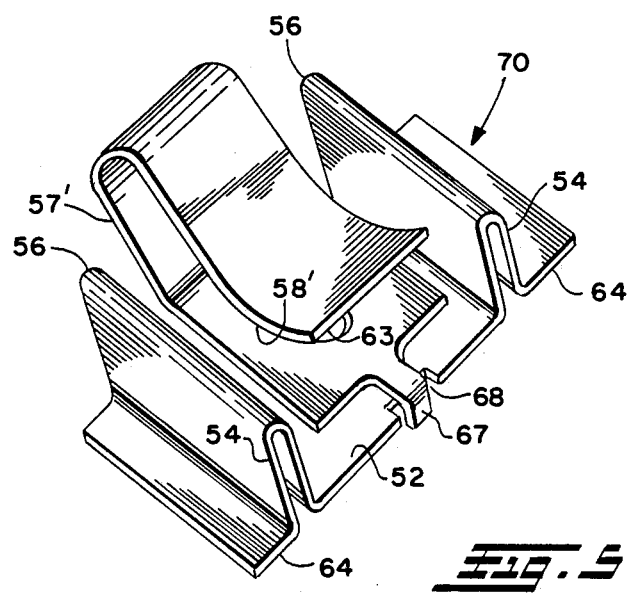

BRAKE SHOE GUIDE MEMBER AND BRAKE USING SAME

INTRODUCTION

This invention relates generally to an expanding shoe drum brake and more particularly to an improved expanding shoe drum brake including a spider member to which a brake shoe including a web structure is pivotably mounted and movable between radially retracted and radially expanded positions in response to rotation of a cam member fixed to the spider member and a guide member is provided for maintaining substantial parallel alignment between the spider member and the web structure as the brake shoe moves between the radially expanded and radially retracted positions.

BACKGROUND OF THE INVENTION

Expanding shoe drum brakes, especially air or hydraulically actuated drum brake systems wherein arcuate brake shoes of a wheeled vehicle are pivotably rotated about an anchor member into engagement with a rotating annular brake drum for the purposes of retarding the velocity of the wheeled vehicle by the use of a brake actuating member, such as a displaceable cam element, are well know in the art. The brake actuating member, usually a rotatable cam element or a linear wedge element, is located between the adjacent ends of the pivotal brake shoes and secured to a rotatable cam shaft or a linear actuation shaft, respectively, for translating oscilliatory, generally linear motion from a power source, such as an air motor or the like, to the brake shoes.

The actuating member, often in the form of a so called "S" cam or a wedge, is usually located between cam or wedge followers, often in the form of rollers or the like, rotatably fixed to the brake shoes.

Example of such prior art cam actuated drum brakes may be seen by reference to U.S. Pat. Nos. 3,497,037; 3,096,857 and 2,002,139 all of which are hereby incorporated by reference.

While the prior art cam and/or wedge actuated drum brakes, especially the "S" cam type drum brakes, are well received and accepted, such prior art devices were not totally satisfactory in certain situations as they usually were relatively heavy structures utilizing cast iron parts and multiple web brake shoes to attain the required strength and the required relative alignment between the parts thereof. The prior art has also included various attempts to produce relatively lighter weight cam actuated drum brakes by the utilization of relatively lighter weight stamped components. While many of these lighter weight brake assemblies have been highly satisfactory for certain applications and have been well commercially received, the prior art devices were not totally satisfactory for certain applications, such as for example, in use for a relatively smaller cam actuated drum brake for a front steer or drive steer axle. In particular, the prior art designs have been heavier and/or more complicated than is desired to achieve the required strength of the parts and/or to assure that the brake shoe is properly aligned with the brake drum, especially in the disengaged position of the brake. As is well known, maintaining proper brake shoe and brake drum alignment is desirable for reducing the required running clearance to a minimum and thus preserving the maximum of effective stroke of an air motor or like the like. Many of the prior art lighter weight brake assemblies have utilized brake shoes having two or more webs and/or brake shoes having full apertures formed therein in which the anchor member or anchor pin was received in attempts to assure that the brake shoes of the drum brake remained properly aligned with the brake drums thereof.

One means by which to maintain substantial parallel alignment between a drum brake spider and a web of a brake shoe during its movement between radially retracted and radially expanded positions and thereby maintaining proper alignment between the brake shoe and the drum is the locating means disclosed in U.S. Pat. No. 4,476,968 which is owned by the Assignee of the present and the disclosure of which is included herein by reference. The locating means however, only engages one side of the brake shoe web and thus may not be able to confine movement of the web in precise parallel relationship with the spider member as the brake shoe moves between the radially expanded and radially retracted positions.

SUMMARY OF THE INVENTION

In accordance with the present invention, the drawbacks of the prior art have been overcome to the extent that an improved drum brake, preferably a cam actuated drum brake, is provided having means in the form of a guide member for maintaining substantial parallel alignment between a drum brake shoe web and a spider member in both the applied and retracted positions of the brake shoe which in turn is effective to align the brake shoe friction element parallel to and in the plane of rotation of the braking surface of the brake drum as well as to dampen brake shoe movement in addition to reducing cost by lessening dimensional control requirements.

Accordingly, it is an object of this invention to provide a guide member for maintaining substantial parallel alignment between a spider and a brake shoe of a drum brake as the brake shoe moves between radially expanded and radially retracted positions.

It is still another objective of this invention to provide an improved shoe drum brake having a guide member operative to maintain substantial parallel alignment between a spider member and a brake shoe as the brake shoe moves between radially expanded and radially retracted positions.

These and other objectives will become apparent from a reading of the detailed description of the preferred embodiment taken in connection with the attached drawings.

BRIEF DESCRIPTION OF THE DRAWINGS

FIG. 1 is a front view of the improved expanding shoe drum brake of the present invention;

FIG. 2 is a side view taken along view line 2—2 of FIG. 1;

FIG. 3 is a front view of an embodiment of the guide member of the invention taken along view line 3—3 of FIG. 1;

FIG. 4 is a side view of the guide member of FIG. 3 taken along view line 4—4; and FIG. 5 is a perspective view of another embodiment of the guide member of the invention.

DETAILED DESCRIPTION OF SOME PREFERRED EMBODIMENTS

FIGS. 1 and 2 show respective front and side views of a cam actuated embodiment 100 of the shoe drum brake of the invention. Although brake 100 may be activated mechanically or hydraulically, it is commonly activated by an air motor such as motor 6 in FIG. 1 which is secured to actuator support 8 which is fixed for example to the frame of a motor vehicle.

Brake 100 is operative to frictionally brake rotary drum 10 such as employed at the end of a motor vehicle axle which may be rotating in either direction as shown by the arrows. Brake 100 has a rotory cam such as "S" cam 12 that is caused to rotate clockwise in FIG. 1 when air motor 41 is activated such as by depressing the brake pedal of a motor vehicle.

Opposed cam surfaces of cam 12 are engaged with cam followers such as follower rollers 14 which are respectively rotatably mounted at one end of the opposed web structure 16. Web structure 16 are respective parts of opposed expandable brake shoes referenced generally by numeral 18 which includes respective arcuate tables 20 that are secured in substantial transverse relationship to web structure 16. A suitable brake friction material 22 is secured to the surface of table 20 facing towards drum 10. Outer radial surface 24 of friction material 22 is operative to frictionally engage inner radial surface 26 of drum 10 when brake shoes 18 are caused to move to an expanded position by rotation of cam 12.

There is an initial predetermined running clearance between surfaces 24 and 26 generally referenced by numeral 28 when brake shoes 18 are in a restarted position (i.e. brakes not applied).

Brake shoes 18 are pivotable about a fixed pivot structure such as anchor pin 30 at their respective opposite ends at a location generally diametrically opposite to the ends having follower rollers 14 engaged with cam 12 as shown in FIG. 1. Each of the opposite ends of brake shoes 18 is provided with a concave cavity 32 whose surrounding surface is held against pin 30 by compression spring 34 secured to web structure 16 as is well known in the art and as shown in FIG. 1.

Follower rollers 14 are held against cam 12 by means of compression retaining spring 36 secured to web structure 16 of opposed brake shoes 18.

Anchor pin 30 is secured to spider 38 which in turn is secured to a fixed frame as shown in FIG. 2. Web structure 16 of each brake shoe 18 is spaced apart from spider 38 and right end 40 of cam shaft 42 is rotatably driven by air motor 6 previously described.

Brake 100 may include a pin 44 secured to spider 38 whose end engages the surface of web structure 16 facing there towards to provide support for brake shoes 18 as they pivot about anchor pin 30 as described in U.S. Pat. No. 4,476,968.

Brake 100 is shown in the radially retracted position in FIG. 1. Application of the brake pedal causes air motor 6 to rotate cam 12 which forces rollers 14 away from each other which causes brake shoes 18 to pivot away from each other about anchor pin 30 and move brake shoes 18 to a radially expanded position causing surface 24 of frictional material 22 to frictionally engage inner radial surface 26 of rotary drum 10 to retard rotation of drum 10. Release of the brake pedal causes rollers 14 to move towards each other and enable brake shoes 18 to pivot about anchor pin 30 and return to their radially retracted positions shown in FIG. 1.

As brake shoes 10 pivot about anchor pin 30, it is important that web structures 16 remain at a substantially constant distance "d" from spider 38 as shown in FIG. 2. To accomplish this purpose, a guide member 50 is secured to the side of spider 38 facing towards web structure 16 which is provided with a slide surface 46 facing towards spider 38 and an opposite slide surface 48 facing away from spider 38 as hereinafter described with respect to FIGS. 3 and 4.

In FIGS. 3 and 4 guide member 50 is a one-piece construction having a central base portion 52 firmly secured by suitable means such as bolt 62 to the side of spider 38 facing towards slide surface 46 of web structure 16 by means of an opening 66 through spider 38 for receiving bolt 62 therethrough. Guide member 50 is preferably located at about the midpoint along the arcuate length of brake shoe 18 as shown in FIG. 1. First and second arms 54 respectively extend towards web structure 16 from opposite sides of base portion 52 which is preferably substantially flat.

Arms 54 respectively curve adjacent slide surface 46 to define respective spaced-apart guide surfaces 56 for engaging slide surface 46.

Although arms 54 may curve towards each other, they preferably curve away from each other and adjacent slide surface 46 as shown in FIG. 3. Arms 54 respectively then curve downwardly towards spider 38 to provide respective convex configurations having the open side thereof facing towards spider 38 and the apex thereof providing spaced-apart generally linear guide lines or surfaces 56 in a plane defined by the spaced-apart generally linear apex lines that is substantially parallel to slide surface 46 and to spider 38.

Arms 54 preferably extend to a position adjacent spider 38 and thence curve away from each other to provide spaced-apart support surfaces 64 that are in substantial parallel alignment with the surface of central base portion 52 that abutts against spider 38 so that surfaces 64 and central base portion 52 all rest against spider 38 when guide member 50 is secured to spider 38.

Guide member 50 is provided with a third arm 57 that is in substantial transverse (perpendicular) relationship to first and second arms. 54 and extends from base portion 52 about a peripheral edge 49 of web structure 16 as shown in FIG. 4 and thence towards opposed second slide surface 48 of web structure 16. Arm 57 curves adjacent surface 48 to define a third guide surface 58 engageable therewith. Guide surface 58 is preferably the apex or generally linear guide line of a convex configuration of arm 57 formed by extending arm 56 towards and thence away from surface 48 with the open side of the convex configuration facing away from surface 48 as shown in FIG. 4.

Arm 57 is operative to resiliently urge guide surface 58 against slide surface 48 by means of resilient Force "F" exerted by arm 56 there toward and hold slide surface 46 against spaced-apart guide surfaces 56.

In cases where the guide member of the invention is secured to the spider by a singular bolt, it may include at least one protuberance such as tab 60 that extends into an opening in spider 38 in registration therewith that is positioned to prevent the guide member from rotating relative to spider 38 and web structure 16.

Guide member 70 shown in FIG. 5 differs from guide member 50 in that third arm 57' is not integral with portion 52 but rather is separate and is held against base portion 52 by having an opening 63 therethrough that is registerable with opening 66 through spider 38 so that arm 57' can be releasably secured to base portion 52 when base portion 52 is releasably secured to spider 38 by means such as bolt 62.

Guide member 70 otherwise includes spaced-apart arms 54, spaced-apart support surfaces 64, spaced-apart first and second guide surfaces 56 and third guide surface 58' previously described.

In cases where guide member 70 is releasably secured to spider 38, third arm 57' preferably includes at least one protuberance such as tab 67 that is in registration and extends into an opening 68 through base portion 52 and even further extends into a corresponding opening in spider 38 in registration therewith positioned to prevent arm 57' from rotating relative arms 54 to maintain the substantial transverse relationship thereto.

By means of the guide member of the invention, web structure 16 is held in a plane substantially parallel to the plane of spider 38 and is able to slide along first and second guide surfaces 56 and third guide surface 58, 58' as brake shoe 10 moves between the radially retracted and radially extended positions which substantially inhances alignment between friction material 22 and inner radial braking surface 26 of drum 10 as well as dampen movement of the brake shoes due to the resilient clamping force "F" exerted by third arm 57, 57'.

Although this invention has been described in its preferred embodiment with a certain degree of particularity, it is understood such description is by way of example only and that certain modifications are possible within the spirit and scope of the invention as hereinafter claimed.

What is claimed is:

1. An improved cam actuated expanding shoe drum brake comprising:
    a spider member;
    a selectively displaceable brake actuation cam means fixed to said spider member,
    a pivot structure fixed to said spider member,
    a pair of generally arcuate radially outwardly movable brake shoes pivotably supported on said pivot structure, each of said brake shoes carrying a cam follower member at one end thereof engaged by said cam means for movement therewith, said cam means having a first position for allowing said brake shoes to be radially retracted and a second position for causing said shoes to be radially expanded,
    each of said brake shoes comprising a web structure having at least one web, said web structure having substantially parallel oppositely facing first and second slide surfaces with said first slide surface in substantially parallel spaced-apart facing relationship with the spider member and having an arcuate table structure disposed generally perpendicular to said web structure and carrying friction material on the radially outer surface thereof, and each of said web structures constructed so as to engage one of said cam followers at one end and provided with a concave surface at the other end thereof pivotably retained on said pivot structure; the improvement comprising means for maintaining substantial parallel alignment between the spider member and the web structure between the radially retracted and radially expanded brake shoe positions, said alignment means comprising;
    a guide member secured by a securing means to the spider member in facing relationship to said web structure first slide surface, said guide member having a central base portion in secured abutting relationship with said spider member, first and second arms which respectively extend towards said web structure first slide surface from opposite sides of the base portion, said arms respectively curving adjacent the web structure first slide surface and defining spaced-apart first and second guide surfaces facing there towards and engageable therewith in a plane substantially parallel thereto, a third arm extending from the base portion intermediate and in substantial transverse relationship to said first and second arms, said third arm extending from the base portion about a peripheral edge of the web structure and thence towards the web structure and curving adjacent the web structure second slide surface to define a third guide surface that is resiliently urged against said second slide surface of said web by the third arm and holds the web structure first slide surface against said first and second guide surfaces, said guide member operative to enable said web structure to slide between said first and second guide surfaces and said third guide surface as the brake shoe moves between the radially expanded and radially retracted positions to maintain the substantial parallel alignment between the web structure and the spider member.

2. The brake of claim 1 wherein the guide member first and second arms curve away from each other to provide the first and second guide surfaces respectively adjacent to and facing towards the web structure first slide surface.

3. The brake of claim 1 wherein the first and second arms curve away from each other and thence towards the spider member to provide respective convex configurations having an open side facing towards the spider member and an apex thereof defining generally linear spaced-apart guide lines adjacent to and facing towards the web structure first slide surface to respectively define said first and second guide surfaces.

4. The brake of claim 3 wherein the first and second arms respectively extend away from the apex towards the spider member and thence curve away from each other adjacent the spider member to provide respective spaced-apart first and second support surfaces on opposite sides of the base portion that are substantially aligned with a surface of the base portion facing towards and engageable with the spider member enabling the base portion and the first and second support surfaces to rest against the spider member when the guide member is secured thereto.

5. The brake of claims 1, 2, 3 or 4 wherein the guide member third arm extends towards and thence away from the web structure second slide surface to provide a convex configuration having the open side thereof facing away from said second slide surface and having an apex of said third arm facing toward said second slide surface defining a generally linear guide line providing the guide member third guide surface.

6. The brake of claim 5 wherein the guide member third arm is a separate member from and is releasably secured to the base portion.

7. The brake of claim 6 wherein the third arm includes at least one protuberance extending into an opening in the spider member positioned to maintain the substantial transverse relationship between the third arm and the first and second arms.

8. The brake of claim 1 wherein the guide member is releasably secured to the spider member, the spider member includes at least one opening therein, and the base portion includes at least one protuberance extending there into positioned to prevent the base portion from rotating relative the spider member and the web structure.

9. A guide member for maintaining substantial parallel alignment between a spider member and at least one brake shoe web structure means pivotable between expanded and retracted positions in response to rotation of a rotatable cam member fixed to the spider member, said web structure having a first slide surface facing towards the spider member and an opposed second slide surface facing away therefrom with the guide member secured to the spider member in facing relationship to the web structure first slide surface, said guide member comprising a central base portion in secured abutting relationship with said spider member, first and second arms which respectively extend towards said web structure first slide surface from opposite sides of the base portion, said arms respectively curving adjacent the web structure first slide surface and defining spaced-apart first and second guide surfaces facing there towards and engageable therewith in a plane substantially parallel thereto, a third arm extending from the base portion intermediate and in substantial transverse relationship to said first and second arms, said third arm extending from the base portion about an edge of the web structure and thence towards the web structure and curving adjacent the web structure second slide surface to define a third guide surface that is resiliently urged against said second slide surface of said web by the third arm and holds the web structure first slide surface against said first and second guide surfaces, said guide member operative to enable said web structure to slide between said first and second guide surfaces and said third guide surface as the brake shoe moves between the expanded and retracted positions to maintain the substantial parallel alignment between the web structure and the spider member.

10. The guide member of claim 9 wherein the guide member first and second arms curve away from each other to provide the first and second guide surfaces respectively adjacent to and facing towards the web structure first slide surface.

11. The guide member of claim 9 wherein the first and second arms curve away from each other and thence towards the spider member to provide respective convex configurations having an open side facing towards the spider member and an apex thereof adjacent to and facing towards the web structure first slide surface to define said first and second guide surfaces as generally linear spaced-apart guide line surfaces.

12. The guide member of claim 11 wherein the first and second arms respectively extend away from each apex towards the spider member and thence curve away from each other adjacent the spider member to provide respective spaced-apart first and second support surfaces on opposite sides of the base portion that are substantially aligned with a surface of the base portion facing towards and engageable with the spider member enabling the base portion and the first and second support surfaces to rest against the spider member when the guide member is secured thereto.

13. The guide member of claims 9, 10, 11 or 12 wherein the guide member third arm extends towards and thence away from the web structure second slide surface to provide a convex configuration having the open side thereof facing away therefrom and having an apex thereof facing there toward defining a generally linear guide line providing the guide member third guide surface.

14. The guide member of claim 13 wherein the guide member third arm is a separate member from and is releasably secured to the base portion.

15. The guide member of claim 14 wherein the spider member includes at least one opening and the third arm includes at least one protuberance extending thereinto positioned to maintain the substantial transverse relationship between said third arm and said first and second arms.

* * * * *